(12) United States Patent
Ilic et al.

(10) Patent No.: US 12,176,825 B2
(45) Date of Patent: Dec. 24, 2024

(54) DC BALANCER CIRCUIT WITH ZERO VOLTAGE SWITCHING

(71) Applicant: Solaredge Technologies Ltd., Herzeliya (IL)

(72) Inventors: Milan Ilic, San Jose, CA (US); Ramesh Govindarajan, Fremont, CA (US); Sang Dong Lee, San Jose, CA (US)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/417,191

(22) Filed: Jan. 19, 2024

(65) Prior Publication Data

US 2024/0162836 A1 May 16, 2024

Related U.S. Application Data

(63) Continuation of application No. 17/865,617, filed on Jul. 15, 2022, now Pat. No. 11,923,786, which is a
(Continued)

(51) Int. Cl.
*H02M 7/537* (2006.01)
*H02M 1/08* (2006.01)
(Continued)

(52) U.S. Cl.
CPC ........... *H02M 7/537* (2013.01); *H02M 1/083* (2013.01); *H02M 1/088* (2013.01); *H02M 3/07* (2013.01);
(Continued)

(58) Field of Classification Search
CPC ........ H02M 3/07; H02M 1/083; H02M 1/088; H02M 1/0058; H02M 3/01; H02M 3/158; H02M 7/483; Y02B 70/10
See application file for complete search history.

(56) References Cited

U.S. PATENT DOCUMENTS 6,349,044 B1 * 2/2002 Canales-Abarca ..... H02M 1/34
363/56.08
9,300,210 B1 * 3/2016 Lidsky ................ H02M 7/4837
(Continued)

FOREIGN PATENT DOCUMENTS

JP 6529707 B1 6/2019

OTHER PUBLICATIONS

Vasic Miroslav et al: "Ultraefficient Voltage Doubler Based on a GaN Resonant Switched-Capacitor Converter", IEEE Journal of Emerging and Selected Topics in Power Electronics, IEEE, Piscataway, NJ, USA, Jun. 1, 2019.
(Continued)

*Primary Examiner* — Yusef A Ahmed
(74) *Attorney, Agent, or Firm* — Banner & Witcoff, Ltd.

(57) ABSTRACT

Disclosed herein are systems and methods for operation of a switched capacitor converter (SCC). In some variations, the SCC includes a resonant circuit including an inductor. Aspects of the disclosure include methods for controlling the SCC switches to decrease switching losses associated with operating the converter and to increase efficiency of the SCC. According to some aspects, a control method is used to switch converter switches under zero-voltage conditions. According to some aspects, a control method is used to switch converter switches under zero-current conditions.

20 Claims, 14 Drawing Sheets

Related U.S. Application Data continuation of application No. 17/137,762, filed on Dec. 30, 2020, now Pat. No. 11,437,929.

(60) Provisional application No. 62/955,627, filed on Dec. 31, 2019.

(51) Int. Cl.
    *H02M 1/088*     (2006.01)
    *H02M 3/07*     (2006.01)
    *H02M 1/00*     (2006.01)
    *H02M 3/00*     (2006.01)
    *H02M 3/158*     (2006.01)

(52) U.S. Cl.
    CPC ............ *H02M 1/0058* (2021.05); *H02M 3/01* (2021.05); *H02M 3/158* (2013.01)

(56) References Cited

U.S. PATENT DOCUMENTS

| | | | |
|---|---|---|---|
| 9,318,974 B2* | 4/2016 | Yoscovich | H02M 7/4837 |
| 9,419,522 B1* | 8/2016 | Khaligh | H02M 3/1582 |
| 9,941,813 B2* | 4/2018 | Yoscovich | H02M 7/4837 |
| 10,075,080 B1* | 9/2018 | Scoones | H02M 3/158 |
| 10,243,455 B2* | 3/2019 | Zheng | H02M 3/07 |
| 10,381,951 B1* | 8/2019 | Moradisizkoohi | H02M 7/537 |
| 10,541,619 B2* | 1/2020 | Ji | H02M 3/33571 |
| 11,063,523 B2* | 7/2021 | Hu | H02M 1/15 |
| 11,146,170 B2* | 10/2021 | Xiong | H02M 3/07 |
| 11,190,104 B2* | 11/2021 | Hu | H02M 3/33523 |
| 12,057,772 B2* | 8/2024 | Mercer | H02M 3/07 |
| 2004/0245972 A1* | 12/2004 | Vire | H02M 3/07 323/282 |
| 2009/0033293 A1* | 2/2009 | Xing | H02J 7/00712 323/284 |
| 2011/0013438 A1* | 1/2011 | Frisch | H02M 7/48 363/131 |
| 2011/0018511 A1* | 1/2011 | Carpenter | H02M 3/158 323/282 |
| 2013/0223651 A1* | 8/2013 | Hoyerby | H03F 3/187 381/120 |
| 2014/0001856 A1* | 1/2014 | Agamy | H02M 3/155 307/43 |
| 2014/0198536 A1* | 7/2014 | Fu | H02M 1/14 363/17 |
| 2015/0003127 A1* | 1/2015 | Takizawa | H02M 7/4837 363/123 |
| 2015/0214887 A1* | 7/2015 | Ben-Yaakov | H02M 3/01 307/52 |
| 2016/0072312 A1* | 3/2016 | Ichikawa | H02M 3/158 307/104 |
| 2016/0190956 A1 | 6/2016 | Levilly et al. | |
| 2016/0261189 A1* | 9/2016 | Lidsky | H02M 3/156 |
| 2017/0104424 A1* | 4/2017 | Shen | H02M 7/42 |
| 2017/0149336 A1* | 5/2017 | Kidera | H02M 7/5387 |
| 2017/0155321 A1* | 6/2017 | Kidera | H02M 7/4837 |
| 2017/0194860 A1* | 7/2017 | Oak | H03K 17/04163 |
| 2017/0201177 A1* | 7/2017 | Kesarwani | H02M 1/14 |
| 2017/0338748 A1* | 11/2017 | Liang | H02M 7/483 |
| 2018/0019669 A1* | 1/2018 | Zhang | H02M 3/07 |
| 2018/0309372 A1* | 10/2018 | Leong | H02M 3/33546 |
| 2018/0337610 A1* | 11/2018 | Leong | H02M 1/083 |
| 2019/0052177 A1* | 2/2019 | Lu | H02M 7/217 |
| 2019/0058416 A1* | 2/2019 | Wang | H02M 7/48 |
| 2019/0280618 A1* | 9/2019 | Yan | H02M 3/158 |
| 2019/0386571 A1* | 12/2019 | Dincan | H02M 3/3376 |
| 2019/0386572 A1* | 12/2019 | Itoh | H02M 1/40 |
| 2020/0091828 A1* | 3/2020 | Fang | H02M 3/01 |
| 2020/0091829 A1* | 3/2020 | Fang | H02M 3/33571 |
| 2020/0119635 A1* | 4/2020 | Rahimi | H02M 1/08 |
| 2020/0161959 A1* | 5/2020 | Chuang | H02M 3/07 |
| 2020/0161967 A1* | 5/2020 | Chuang | H02M 7/4833 |
| 2020/0266719 A1* | 8/2020 | Oh | H02M 7/5387 |
| 2020/0321860 A1* | 10/2020 | Amin | H02M 3/158 |
| 2020/0343816 A1* | 10/2020 | Wu | H02M 1/083 |
| 2020/0373839 A1* | 11/2020 | Fu | H02M 3/158 |
| 2020/0412239 A1* | 12/2020 | Grbovic | H02M 3/07 |
| 2021/0050797 A1* | 2/2021 | Xu | G01R 19/175 |
| 2021/0067045 A1* | 3/2021 | Zhang | H02M 3/33573 |
| 2021/0152100 A1* | 5/2021 | Zilio | H02M 7/4837 |
| 2021/0194358 A1* | 6/2021 | Jing | H02M 1/36 |
| 2021/0336547 A1* | 10/2021 | Hirokawa | H02M 1/0095 |
| 2021/0359606 A1* | 11/2021 | Han | H02M 1/0054 |
| 2021/0367532 A1* | 11/2021 | Kidera | H02M 7/4837 |
| 2022/0045622 A1* | 2/2022 | Oi | H02M 7/5387 |
| 2022/0190712 A1* | 6/2022 | Chen | H02M 1/4225 |
| 2022/0190714 A1* | 6/2022 | Ye | H02M 3/07 |
| 2022/0190738 A1* | 6/2022 | Chen | H02M 1/007 |
| 2022/0286049 A1* | 9/2022 | Fujii | H02M 3/158 |
| 2022/0321008 A1* | 10/2022 | Choi | H02M 1/0095 |
| 2022/0393577 A1* | 12/2022 | Shao | H02M 3/07 |
| 2023/0122225 A1* | 4/2023 | Mercer | H02M 3/158 323/271 |
| 2023/0216399 A1* | 7/2023 | Wijekoon | H02M 7/4833 323/271 |
| 2023/0396168 A1* | 12/2023 | Choi | H02M 3/07 |
| 2024/0258923 A1* | 8/2024 | Qin | H02M 3/157 |

OTHER PUBLICATIONS

Stevanovic Branislav et al: "Highly Efficient, Full ZVS, Hybrid, Multilevel DC/DC Topology for Two-Stage Grid-Connected 1500-V PV System With Employed 900-V SiC Devices", IEEE Journal of Emerging and Selected Topics in Power Electronics, IEEE, Piscataway, NJ, USA, Jun. 1, 2019.

Stevanovic Branislav et al: "900V SiC Based, Hybrid, Multilevel DC/DC Topology for 1500VDC PV Application" 2019 IEEE Applied Power Electronics Conference and Exposition (APEC), IEEE, Mar. 17, 2019.

Schaef Christopher et al: "A Hybrid Switched-Capacitor Battery Management IC With Embedded Diagnostics for Series-Stacked Li-Ion Arrays" IEEE Journal of Solid-State Circuits, IEEE, USA, Dec. 1, 2017.

Sangwan Rahul et al: "High-density power 1,15 converters for sub-module photovoltaic power management" 2014 IEEE Energy Conversion Congress and Exposition (ECCE), IEEE, Sep. 14, 2014.

Kesarwani Kapil et al: "The 1,15 direct-conversion resonant switched capacitor architecture with merged multiphase interleaving: Cost and performance comparison" 2015 IEEE Applied Power Electronics Conference and Exposition (APEC), IEEE, Mar. 15, 2015.

Rentmeister Jan S. et al: "A flying capacitor multilevel converter with sampled valley-current detection for multi-mode operation and capacitor voltage balancing" 2016 IEEE Energy Conversion Congress and Exposition (ECCE), Sep. 1, 2016.

Ni Ze et al: "Development of a 100 kW SiC Switched Tank Converter for Automotive Applications", 2019 IEEE Energy Conversion Congress and Exposition (ECCE), IEEE, Sep. 29, 2019.

May 6, 2021—European Search Report—EP 20217902.4.

Kesarwani Kapil et al: "Resonant and multi-mode operation of flying capacitor multi-leveel DC-DC converters" 2015 IEEE 16th Workshop on Control and Modeling for Power Electronics (COMPEL), IEEE, Jul. 12, 2015.

Oct. 17, 2022—EP Office Action—EP App. No. 20217902.4.

You Hongcheng et al., "A Three-Level Modular DC/DC Converter Applied in High Voltage DC Grid," IEEE Access, vol. 6, pp. 25448-25462.

Liu Bo et al., "A Variable Frequency ZVS Control of a Three-Level Buck without Zero Crossing Detection for Wide-Range Output Voltage Battery Chargers," IEEE Applied Power Electronics Conference and Exposition (APEC), IEEE Mar. 17, 2019, pp. 2311-2316.

Settels Sjef J et al., "Charge-based Zero-Voltage Switching of a Flying Capacitor Resonant Pole Inverter with Trapezoidal Filter Current," 42nd Annual Conference of the IEEE Industrial Electronics Society, IEEE, Oct. 23, 2016, pp. 3282-3287.

(56) References Cited

OTHER PUBLICATIONS

Nov. 30, 2023—EP Summons to Attent Oral Proceedings—EP Application No. 20217902.4.

* cited by examiner

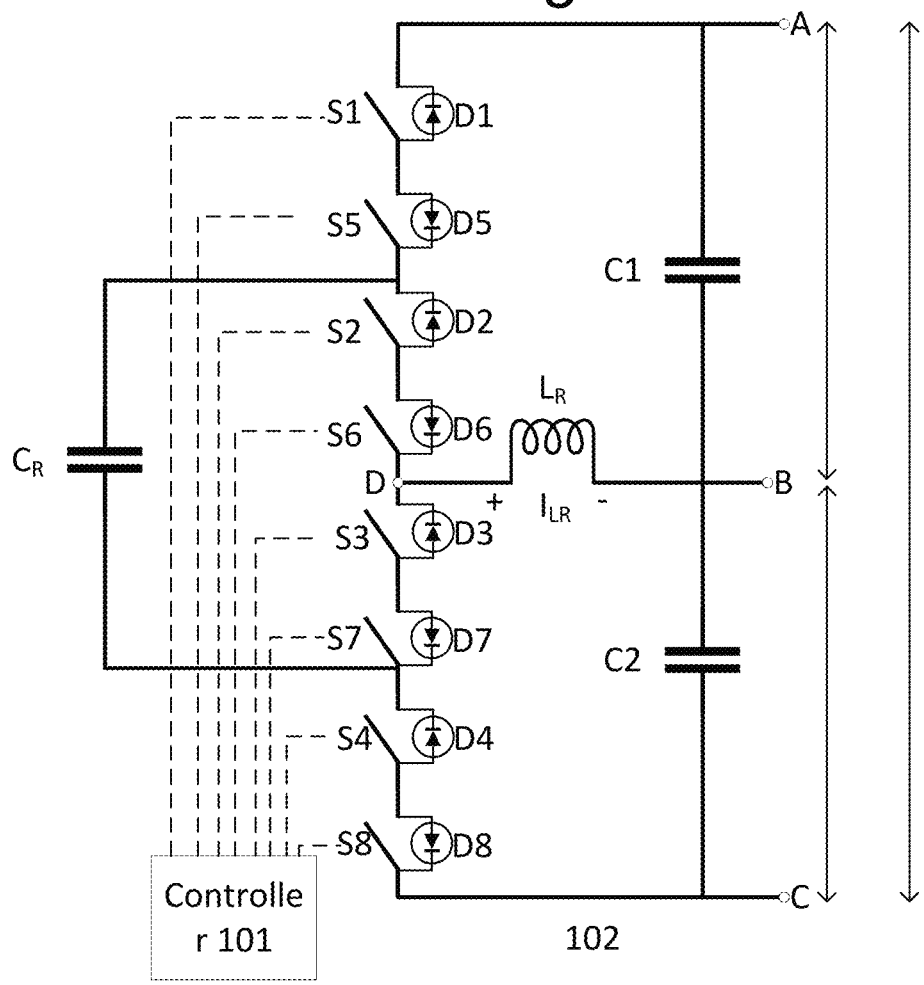

Fig. 1D
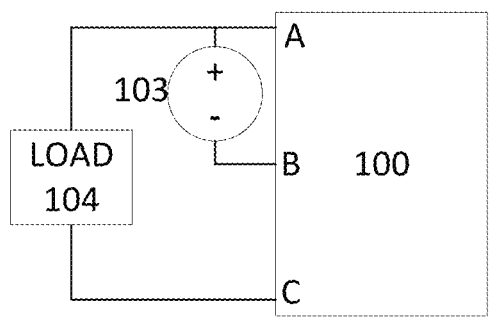
100A
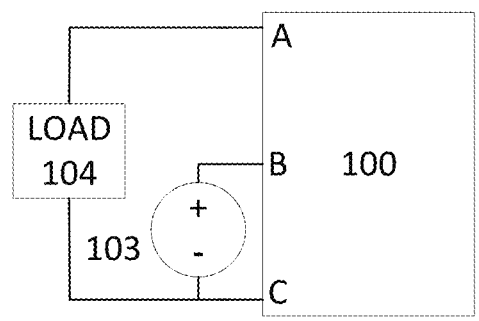
100B
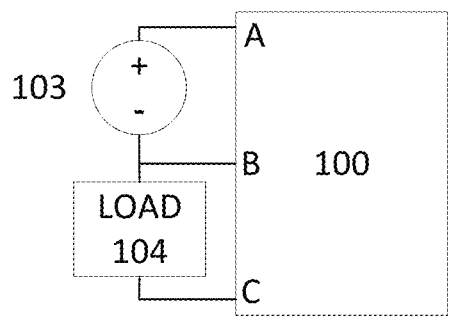
100C
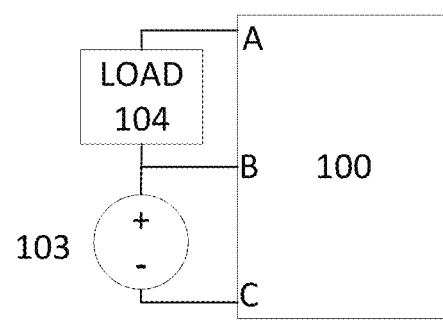
100D
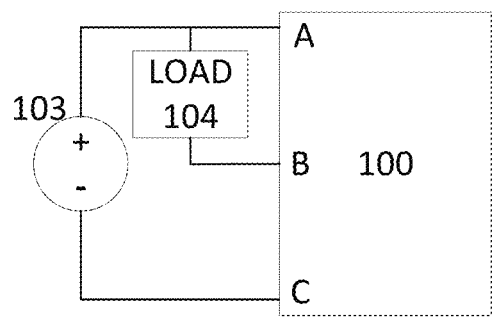
100E
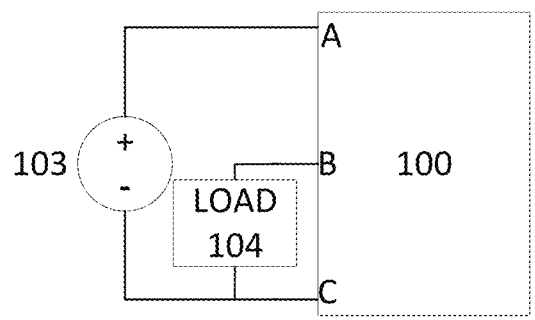
100F

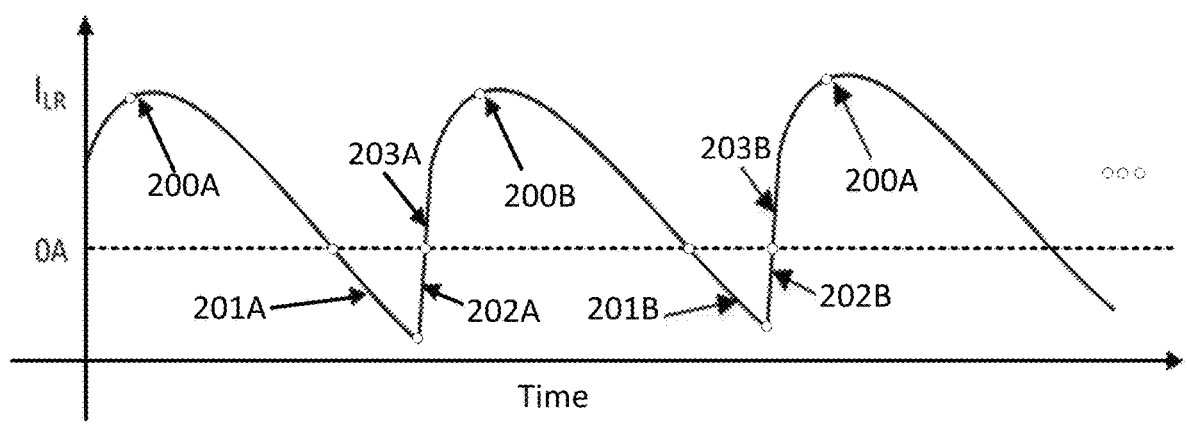

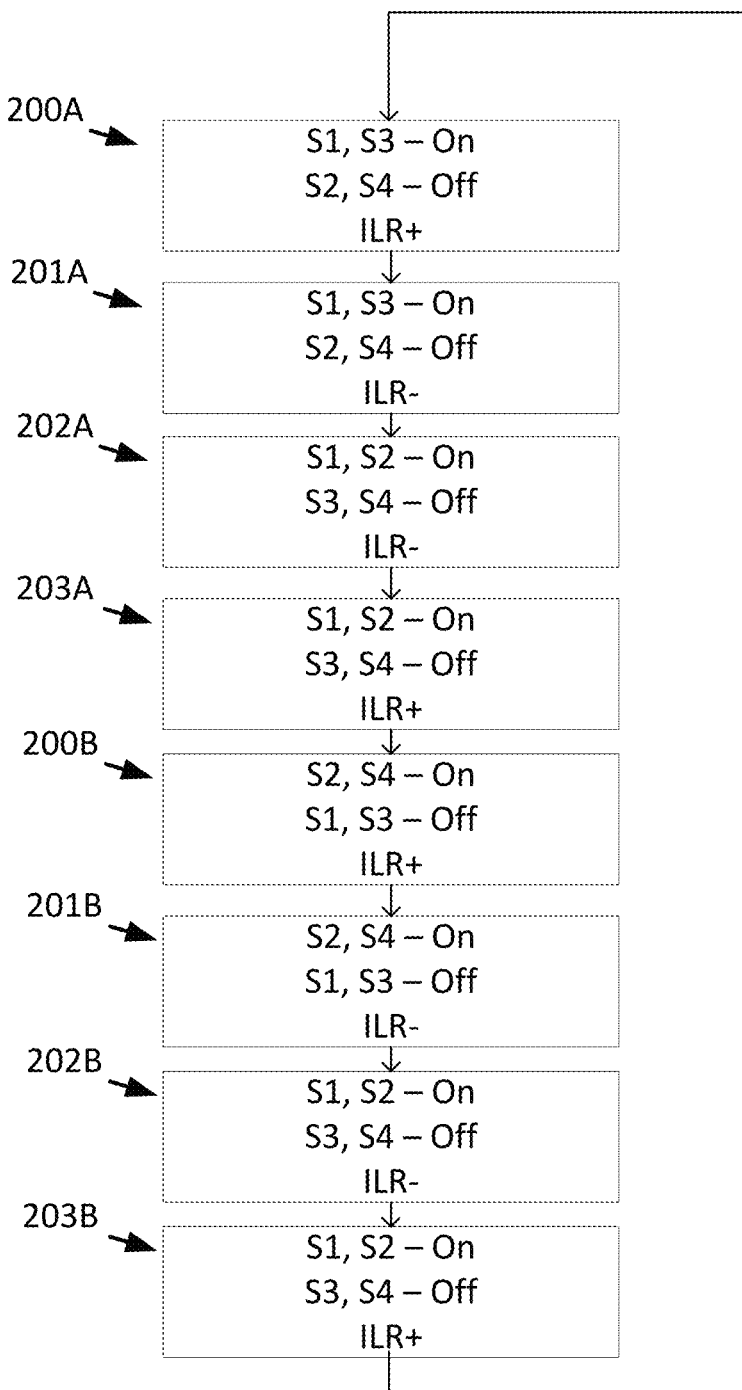

Fig. 6
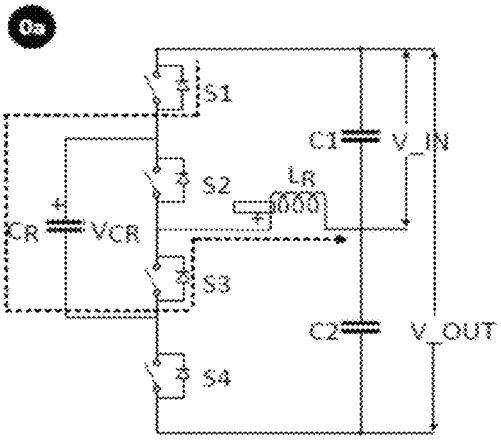
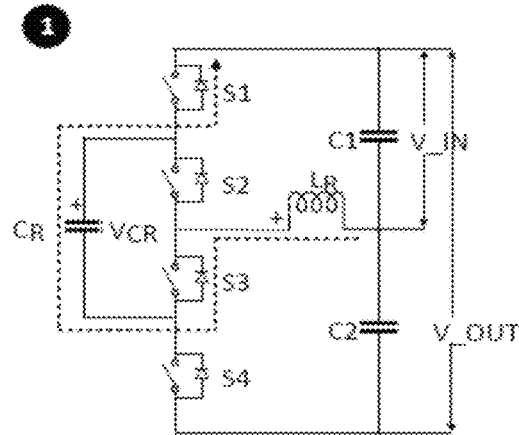
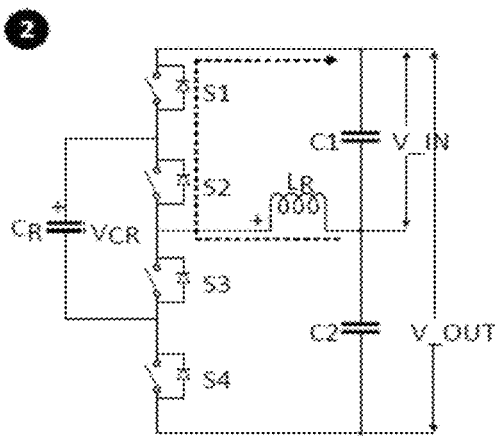
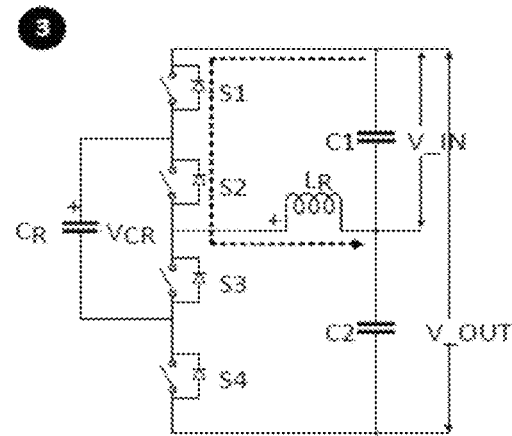
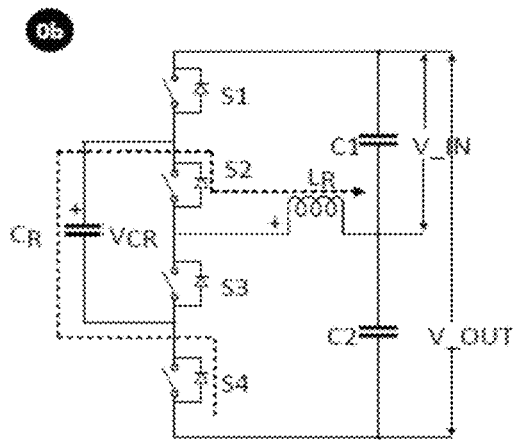

Fig. 8
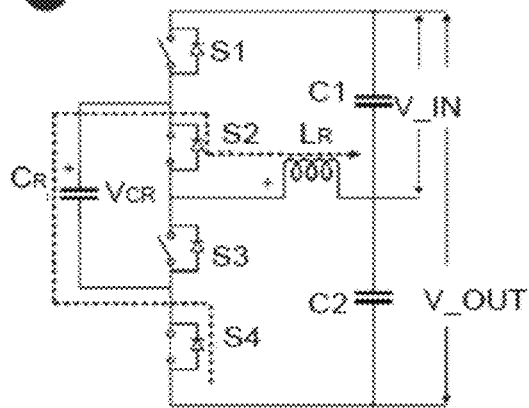
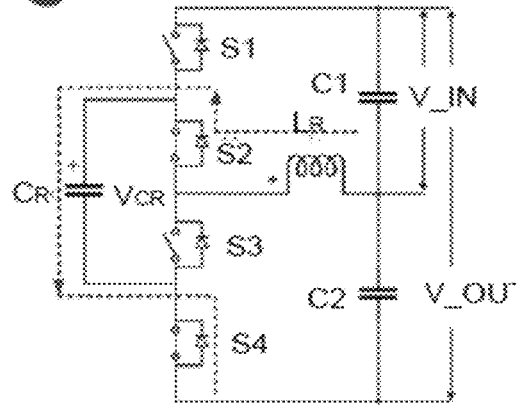
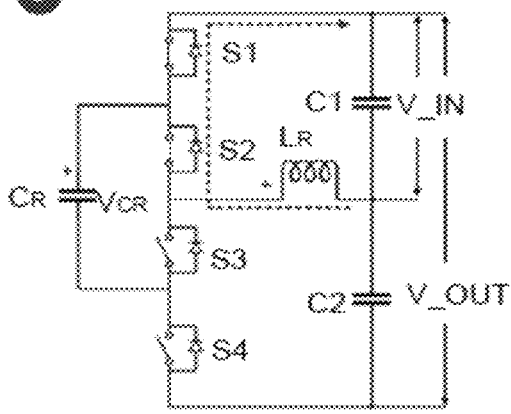
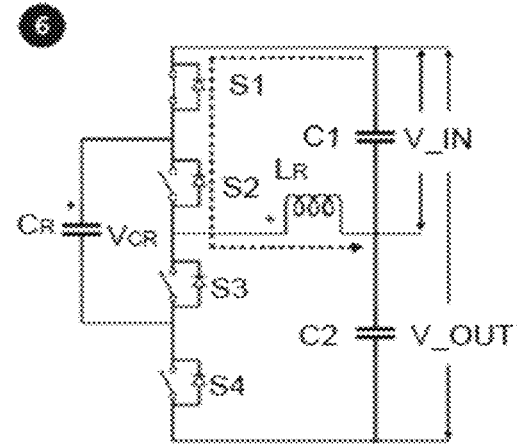
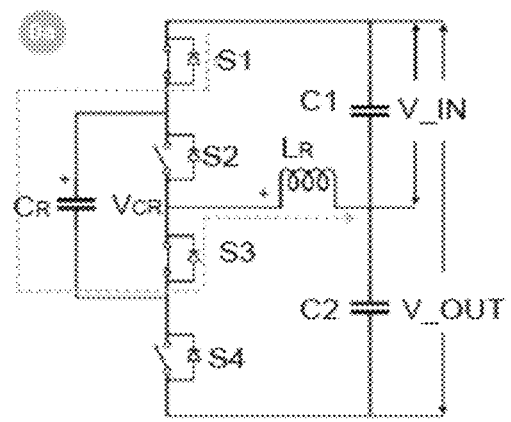

DC BALANCER CIRCUIT WITH ZERO VOLTAGE SWITCHING

CROSS-REFERENCE TO RELATED APPLICATIONS

This application is a continuation of U.S. patent application Ser. No. 17/865,617, filed Jul. 15, 2022, which is a continuation of U.S. patent application Ser. No. 17/137,762, filed Dec. 30, 2020, which claims priority to U.S. Provisional Patent Application No. 62/955,627, filed Dec. 31, 2019, the contents of which are incorporated by reference in their entireties.

BACKGROUND

A switched capacitor circuit includes power switches and at least one capacitor, and may, be used to implement output-voltage-regulated power converters. In many cases, switching may incur significant losses due to voltages disposed across the switch and/or current flowing through the switch when the switch state is reversed. Losses may be increased by operating the switches at high frequency.

SUMMARY

The following summary presents a simplified summary of certain features. The summary is not an extensive overview and is not intended to identify key or critical elements.

Systems, apparatuses, and methods are described for a switched capacitor converter (SCC). The SCC may include a resonant circuit including an inductor. The SCC may be configured to be operable in multiple modes. For example, according to some features, the SCC may include terminals that may be used as input terminals or as output terminals. In some arrangements, an input voltage may be converted to an output voltage (e.g., an output voltage that is about double the input voltage, or an output voltage that is about half the input voltage).

Aspects of the disclosure herein further include methods for controlling the SCC switches (e.g., modulation methods) to decrease switching losses associated with operating the converter, and to increase efficiency of the SCC. According to some aspects, a control method may be used to switch converter switches under zero-voltage conditions or zero-current conditions.

These and other features and advantages are described in greater detail below.

BRIEF DESCRIPTION OF THE DRAWINGS

The accompanying drawings, which are incorporated in and constitute a part of this specification, exemplify embodiments of the present invention and, together with the description, serve to explain and illustrate principles of the invention. The drawings are intended to illustrate various features of the illustrated embodiments in a diagrammatic manner. The drawings are not intended to depict every feature of actual embodiments nor relative dimensions of the depicted elements, and are not necessarily drawn to scale.

The invention is herein described, by way of example only, with reference to the accompanying drawings, wherein:

FIG. 1C illustrates a third example circuit in accordance with various aspects of the disclosure herein;

FIG. 1D illustrates other example circuits in accordance with various aspects of the disclosure herein;

FIG. 2A illustrates a current flow in a circuit in accordance with various aspects of the disclosure herein;

FIG. 2B illustrates a flow chart corresponding to current flow in a circuit, in accordance with various aspects of the disclosure herein;

FIG. 6 illustrates the operation of a circuit in accordance with various aspects of the disclosure herein;

FIG. 8 illustrates the operation of a circuit in accordance with various aspects of the disclosure herein.

DETAILED DESCRIPTION

Figure 1A:
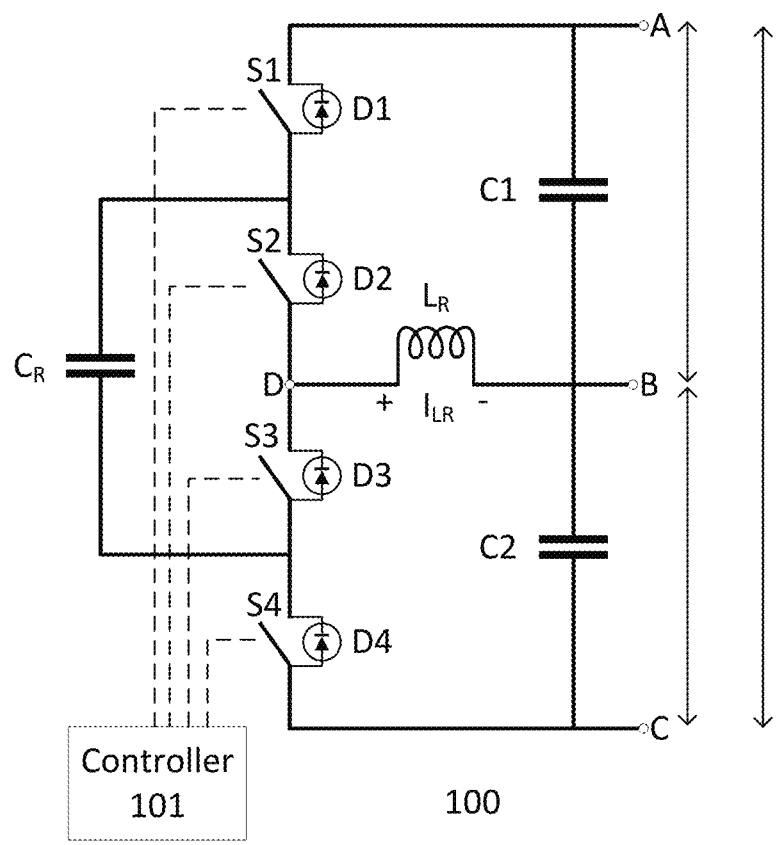
FIG. 1A illustrates a first example circuit in accordance with various aspects of the disclosure herein.

Aspects of the disclosure herein further include methods for controlling SCC switches (e.g., modulation methods) to, for example, decrease switching losses associated with operating the converter and/or to increase efficiency of the SCC. According to some aspects, a control method may be used to switch converter switches under zero-voltage conditions or zero-current conditions. Some features are shown by way of example, and not by limitation, in the accompanying drawings. In the drawings, like numerals reference similar elements. Some figures may be duplicative and/or depict different aspects of the same, similar, or interconnected systems (e.g., one or more portions of FIG. 1A or FIG. 1C may be duplicative of FIG. 1D).

Reference is now made to FIG. 1A which shows an example circuit 100 in accordance with the disclosure herein. Circuit 100 comprises four switches S1, S2, S3, and S4. Switches S1, S2, S3, and S4 may be connected in series, and each may be coupled in parallel to a bypass device (e.g., a diode). For example, first switch S1 may be coupled in parallel to a first bypass device D1, second switch S2 may be coupled in parallel to a second bypass device D2, third switch S3 may be coupled in parallel to a third bypass device D3, and/or fourth switch S4 may be coupled in parallel to a fourth bypass device D4. The four switches may be transistors or a group of transistors that together form a single switch. Transistors may comprise metal oxide silicon field-effect transistors (MOSFETs), junction gate field-effect transistors (JFETs), bipolar junction transistor (BJTs), insulated-gate bipolar transistors (IGBTs), bidirectional switches, anti-parallel switches (for example, as shown in FIG. 1C), and/or any appropriate means of switching within a circuit. A bypass device may comprise one or more elements separate from the bypass device's respective switch. Examples for the elements of the bypass devices include a large signal diode, a Schottky diode, a tunnel diode, a PIN diode, and/or any appropriate means of allowing unidirectional electrical flow within a circuit. The bypass devices may comprise built-in body diodes (e.g., each may be a MOSFET's parasitic diode).

The four switches may be connected in series between node A and node C, where node D is a midpoint of the series connection. Switch S1 may be coupled to node A (e.g., at a drain terminal of switch S1, such as when switch S1 is a MOSFET) and to switch S2 (e.g., at a source terminal of switch S1, when switch S1 is a MOSFET). Switch S2 may be coupled to switch S1 (e.g., at a drain terminal of switch S2, such as when switch S2 is a MOSFET) and to node D (e.g., at a source terminal of switch S2, when switch S2 is a MOSFET). Switch S3 may be coupled to node D (e.g., at a drain terminal of switch S3, such as when switch S3 is a MOSFET) and to switch S4 (e.g., at a source terminal of switch S3, when switch S3 is a MOSFET). Switch S4 may be coupled to switch S3 (e.g., at a drain terminal of switch S4, such as when switch S4 is a MOSFET) and to node C (e.g., at a source terminal of switch S4, when switch S4 is a MOSFET). The connections between the different switches may be dependent on the types of the given switches S1, S2, S3, and S4. For example, the connection between the switches S1, S2, S3, and S4 may be dependent upon the arrangement of the drain terminal, source terminal, and body diode of the given switch. As an example, all of the switches S1, S2, S3, and S4 may be either N type MOSFETs or P type MOSFETs, which may all be connected in a series of one source terminal of one switch being connected to one drain terminal of another switch. As another example, the switches S1, S2, S3, and S4 may include a combination of different types of switches, e.g., some N type MOSFETs and some P type MOSFETs, with an appropriate connection arrangement between the different switches.

Switches S1, S2, S3, and S4 May be controlled by controller 101, Controller 101 may control the switches to be turned on (e.g., allowing current to flow through the switch) or turned off (e.g., preventing current from flowing through the switch), in one or both directions, depending on the type of switch. In the example where the switches S1, S2, S3, and S4 are MOSFETs, controller 101 may be coupled to the gate of each MOSFET, The coupling between controller 101 and the gate of the MOSFET may create a gate-to-source voltage to control the MOSFET to be on or off. The coupling may be direct, or may be through a gate driver that amplifies a signal to the gates of the switches S1, S2, S3, and S4. Controller 101 may be a digital controller, an analog controller, an analog control circuit, digital signal processor (DSP) controller, a microcontroller unit (MCU), a field-programmable gate array (FPGA), an application-specific integrated circuit (ASIC), a microprocessor, memory executing instructions (e.g., in conjunction with a microprocessor, and/or computer software (e.g., executing on a general purpose processor).

Circuit 100 may comprise a resonant circuit. A resonant circuit may comprise an inductor coupled to a capacitor, and may oscillate at a resonant frequency of $$f_R = \frac{1}{2 \cdot \pi \sqrt{LC}} [Hz],$$

wherein L is the inductance of the inductor and C is the capacitance of the capacitor. The resonant circuit of circuit 100 comprises a winding $L_R$ and a power bank $C_R$, by non-limiting example is illustrated as an inductor and a capacitor, and is configured to resonate at a frequency of $$f_R = \frac{1}{2 \cdot \pi \sqrt{L_R C_R}} [Hz].$$

The power an $C_R$ may be connected in parallel to the switches S2 and S3. The winding $L_R$ may be connected between node D and node B. The power bank $C_R$ may be any appropriate device for creating and/or maintaining a voltage differential. The winding $L_R$ may be any number of windings of a coil, choke, inductor, reactor, or any appropriate means of storing energy over a magnetic field. Power banks C1 and C2, here by non-limiting example shown as capacitors, may hold voltage differentials between nodes A and B and between nodes B and C, respectively. The resonating of the resonating circuit may occur by the circuit storing power in an electrical field created by the power banks (e.g., the power banks C1, C2, and $C_R$), transferring the stored power to a magnetic field created by the winding (e.g., the winding $L_R$), and continuously transitioning back and forth between resonance states.

Nodes A, B, and C may be used as input terminals, output terminals, or both. Two of the nodes may be used as input terminals for receiving an input voltage. For example, a first subset of input terminals may comprise two out of the three nodes A, B and C. The circuit may be operated to provide an output voltage across a second subset of two of the three nodes (e.g., with the second subset of nodes used as output terminals).

The first subset of terminals and the second subset of terminals may partially overlap (e.g., may share at least one terminal). Further, the operation of circuit 100 may be interchangeable, enabling bidirectional conversion of power. For example, the first subset may be used as input terminals and the second subset may be used as output terminals, (e.g., wherein the circuit may be operated to convert power from the first subset of terminals to the second subset of terminals). In another example, the first subset may be used as output terminals and the second subset may be used as input terminals (e.g., wherein the circuit may be operated to convert power from the second subset of terminals to the first subset of terminals).

Figure 1B:
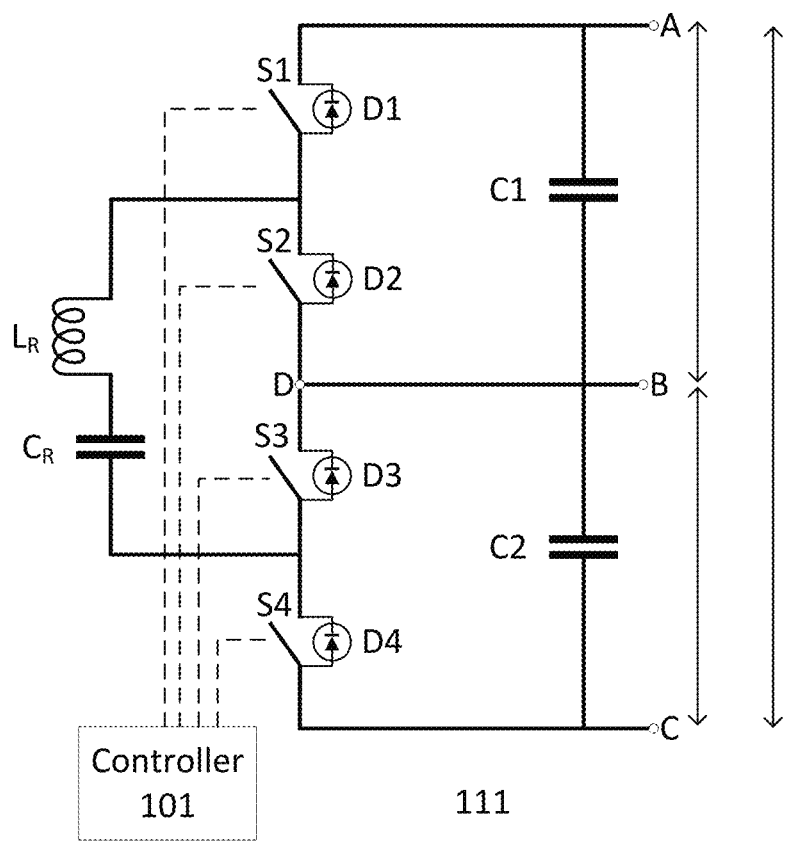
FIG. 1B illustrates a second example circuit in accordance with various aspects of the disclosure herein.

Referring now to FIG. 1B, circuit 111 may have a structure similar to circuit 100, but with the winding $L_R$ of the resonant circuit and the power bank $C_R$ of the resonant circuit connected in series to each other. In this example node B may be directly connected to node D.

Referring now to FIG. 1C, circuit 102 may have a structure similar to or the same as circuit 100 in FIG. 1A, but with the addition of switches S5-S8 connected in series with switches S1-S4 (which may be switches S1-S4 of FIG. 1A) to form bidirectional switches, by orienting each pair of series-connected switches such that each pair of corresponding bypass diodes are connected head-to-head or back-to-back. The bi-directional switches may be provided for use in the case of AC voltage input. The switches may allow further control and degrees of freedom as well as prevent unwanted flow of reverse current across the switches.

Input terminals and output terminals (e.g., input terminals and output terminals of FIG. 1A, FIG. 1B, or FIG. 1C) may be configured in various arrangements, such as may be shown in FIG. 1D. The input terminals are coupled to power source 103 and output terminals are coupled to load 104, which may form a system. First arrangement 100A comprises a first subset of nodes A and B configured for use as input terminals and a second subset of nodes A and C configured for use as output terminals. Second arrangement 100B comprises a first subset of nodes B and C configured for use as input terminals and a second subset of nodes A and C configured for use as output terminals. Third arrangement 100C comprises a first subset of nodes A and B configured for use as input terminals and a second subset of nodes B and C configured for use as output terminals. Fourth arrangement 100D comprises a first subset of nodes B and C configured for use as input terminals and a second subset of nodes A and B configured for use as output terminals. Fifth arrangement 100E comprises a first subset of nodes A and C configured for use as input terminals and a second subset of nodes A and B configured for use as output terminals. Sixth arrangement 100F comprises a first subset of nodes A and C configured for use as input terminals and a second subset of nodes B and C configured for use as output terminals.

First arrangement 100A and the second arrangement 100B may operate in substantially the same manner. The third arrangement 100C and fourth arrangement 100D may operate in substantially the same manner. The fifth arrangement 100E and the sixth arrangement 100F may operate in substantially the same manner Referring back to FIG. 1A, the operation of circuit 100 may include controlled resonance of the resonant circuit through the switching of the switches to cause the voltage across C2 to follow the voltage across C1, or to cause the voltage across C1 to follow the voltage across C2. The voltage following between voltage over C1 and voltage over C2 may be proportional, for example, a roughly one-to-one voltage ratio. In the one-to-one ratio example, circuit 100 may act as a voltage doubler, wherein nodes A and B, and/or nodes B and C, are used as input terminals and nodes A and C are used as output terminals. For example, if input terminal nodes A and B have a voltage differential of about 400V, then the output terminal nodes A and C may output a voltage differential of about 800V. In the one-to-one ratio example, circuit 100 may act as a voltage halver, where nodes A and C are used as input terminals and nodes A and B or nodes B and C are used as output terminals. For example, if input terminal nodes A and C have a voltage differential of about 800V, then the output terminal nodes A and B may receive a voltage differential of about 400V. In a one-to-one voltage ratio example, circuit 100 may act as a voltage isolator, where nodes A, B or nodes B, C are used input terminals and nodes B, C or nodes A, B are used as output terminals respectively. For example, if input terminal nodes A and B have a voltage differential of about 400V than the output terminal nodes B and C may receive a voltage differential of about 400V.

Figure 1E:
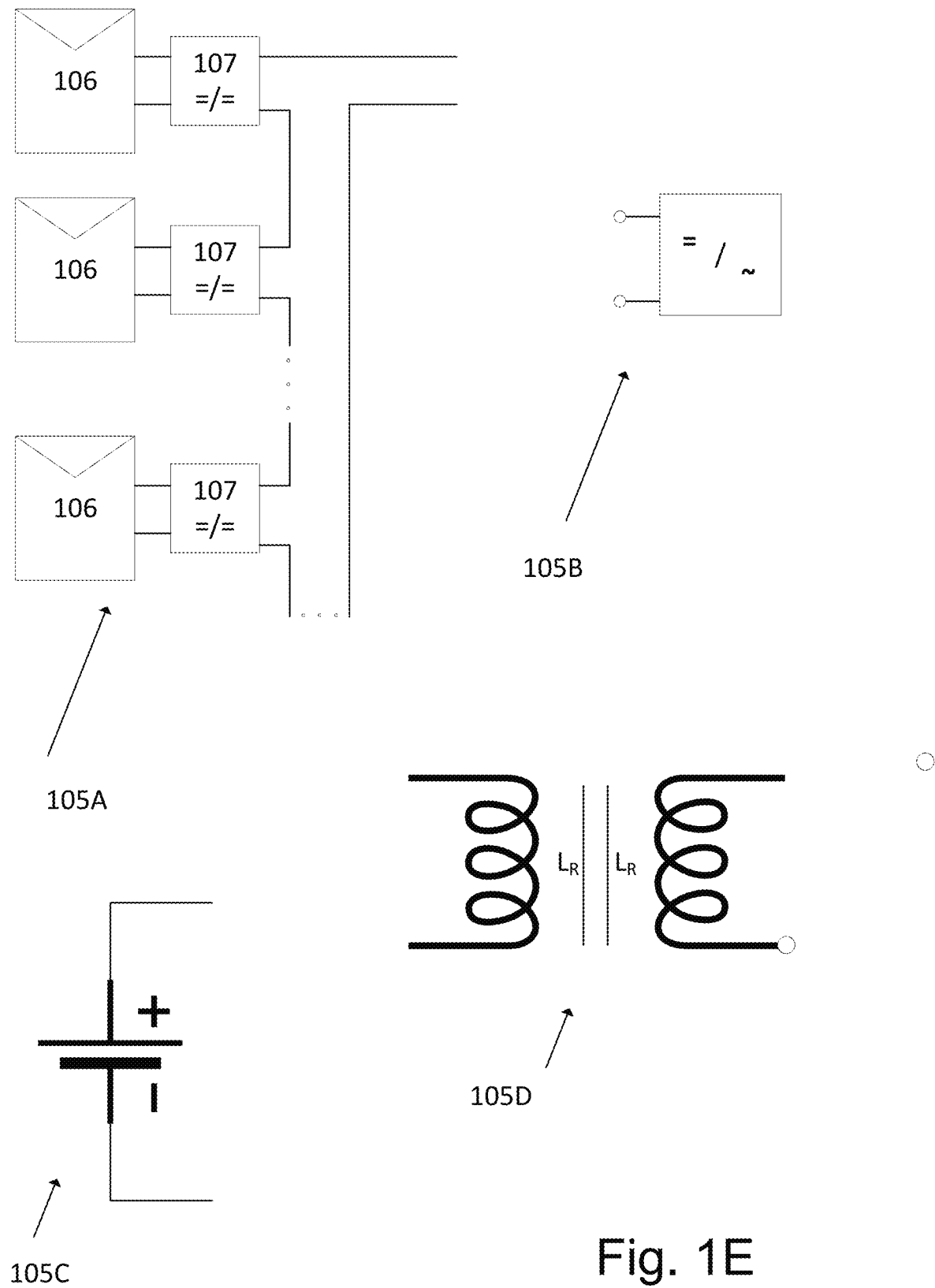
FIG. 1E illustrates example systems in accordance with various aspects of the disclosure herein.

Reference is now made to FIG. 1E which shows example inputs and outputs for circuit 100 (or other circuits shown herein). Circuit 100 may be coupled to other components, forming a system. Photovoltaic (PV) system 105A may be a power generator, such as power source 103. PV system 105A may comprise a PV farm of one or more PV strings, wherein each string may include one or more PV cells or PV panels 106. Each PV cell or panel may be coupled to a DC/DC converter 107. DC/DC converter 107 may be a boost converter, a buck converter, a buck-boost converter, and/or any appropriate means of converting DC to DC. The DC/DC converter 107 may include a maximum power point tracking (MPPT) function and/or element. The PV strings may further be coupled to combiner boxes that combine a voltage of one or more PV panels 106 and an inverter or transformer 105B to receive the voltage from PV panels 106. The inverter or transformer 105B may further comprise an uninterruptable power source (UPS). PV system 105A is an exemplary PV system and is not limited to the structure laid forth. Circuit 100 may be coupled to any part of the PV system 105A. For example, the PV panel of circuit 100 may be coupled to the DC/DC converter. In another example, a DC/DC converter of circuit 100 may be coupled to a PV string. In another example, a DC/DC converter of circuit 100 may be coupled to a junction or combiner box. In another example, a DC/DC converter of circuit 100 may be coupled from a PV string or a junction or combiner box to inverter or transformer 105B. In another example, a DC/DC converter of circuit 100 may be coupled from a PV string or a junction or combiner box to a UPS. In another example, a DC/DC converter of circuit 100 may be coupled from a UPS to inverter or transformer 105B.

Another example system is a battery 105C. The circuit may be used (e.g., when the system is battery 105C) in conjunction with charging the battery through output terminals, or discharging the battery through input terminals, or a combination of both. Another example system 105D may be an inductor or transformer. Circuit 100 or circuit 102 may be coupled to the end of the system 105D and receive an AC voltage. The circuit 100 or the circuit 102 may be placed at the end of an inverter with a tap. The inverter may be a 3-level neutral point clamped inverter (NPC inverter). The circuit 100 or circuit 102 may be used to balance the middle point tap to two equal voltage valued sides. System 105D may mimic a split phase system wherein the circuit 100 or the circuit 102 may halve the inverter or transformer output to create two voltage halves of equal proportion. This may have the advantage of increasing compatibility with electrical systems that operate under split phase, such as US households and/or the US power grid.

Reference is now made to FIG. 2A and FIG. 2B, which show examples of the controlled periodic switching states of circuit 100 by controller 101. The switching from state to state may be oriented to soft switch. Soft switching may have the benefit of lower switching losses. Soft switching may involve zero current switching (ZCS), zero voltage switching (ZVS), or both. ZCS may be achieved by the current through the switch being brought to zero or near zero before the switch is turned on or off. Additionally or alternately, ZVS may be achieved by the voltage across the switch being brought to zero (or near zero) before the switch is turned on or off. Circuit 100 may use soft switching in one or more switching transitions and may soft switch a majority of the switching transitions.

Switching frequency, or $f_{SW}$, may refer to a rate at which one or more states switch. Switching frequency $f_{SW}$ may be of a value higher or lower than the resonating frequency $f_R$ (in Hz). Both the resonating frequency $f_R$ and the switching frequency $f_{SW}$ may be close in proximity (in Hz) and be no further than for example 15 KHz, 10 KHz, or 5 KHz from one another. For example, if the resonating frequency $f_R$ is 50 KHz then the switching frequency $f_{SW}$ may be 40 KHz-60 KHz (e.g., 45 KHz in the example of a 10 KHz range). Circuit 100 may be operated by the switching frequency $f_{SW}$ in an open loop feedback system and may be independent from the process output.

The periodic states composing the controlled periodic switching states are 200A, 201A, 202A, 203A, 200B, 201B, 202B, 203B. The A states and the B states may be similar in form (e.g., state 200A may be similar to state 200B, etc.). The flow of current in a positive direction or a negative direction indicate a reverse of current polarity to one another and not limiting to a specific direction. The turning off and/or turning on for the switches may be done actively and/or passively, and may be done with a signal or without a signal. The resonating circuit may oscillate and/or reverse current back and forth in the positive and negative direction.

In state 200A, switches S1 and S3 are "on," switches S2 and S4 are "off," and winding current ILR is flowing in the positive direction. Switch S1 may have current flowing through a parallel bypass device at first before turning on under ZCS. In state 201A, switches S1 and S3 are "on," switches S2 and S4 are "off," and winding current ILR may reverse and flow in the negative direction. The winding current ILR may reverse due to the oscillations of the resonating circuit. In state 202A, switches S1 and S2 are "on," switches S3 and S4 are "off," and winding current ILR is flowing in the negative direction. Switch S3 may be turned off when the current has low magnitude (e.g., close to ZCS). The current may start flowing through the parallel bypass device of switch S2 before switch S2 is turned on, and may be turned on under ZVS. In state 203A, switches S1 and S2 are "on," switches S3 and S4 are "off," and winding current ILR may reverse and flow in the positive direction. Switch S1 may be turned on by the current flowing through the parallel bypass device and may have the switch turned off at or near ZVS and/or ZCS. The winding current ILR may reverse due to the oscillations of the resonating circuit. In state 200B, switches S2 and S4 are "on," switches S1 and S3 are "off," and winding current ILR is flowing in the positive direction. Switch S4 may have current flowing through parallel bypass device at first, and may turn on under ZCS. In state 201B, switches S2 and S4 are "on," switches S1 and S3 are "off," and winding current ILR may reverse and flow in the negative direction. The winding current ILR may reverse due to the oscillations of the resonating circuit. In state 202B, switches S1 and S2 are "on," switches S3 and S4 are "off," and winding current ILR may flow in the negative direction. Switch S4 may be turned off when the current has a low magnitude (e.g., close to ZCS). The current may start flowing through the parallel bypass device of switch S1 before switch S1 is turned on, and may be turned on under ZVS. In state 203B, switches S1 and S2 are "on," switches S3 and S4 are "off," and winding current ILR may reverse and flow in the positive direction. switch S2 may be turned off while the current is flowing through the parallel bypass device and may be turned off at or near ZVS and/or ZCS. The winding current ILR may reverse due to the oscillations of the resonating circuit. After state 203B, in a periodic fashion the following state may proceed back with state 200A and the cycle repeats. In some examples, state 200A and state 201A may be part of a sine wave. State 202A may be linear. State 202B may be part linear and part sine wave. Similarly, state 200B and state 201B may be part of a sine wave. State 202B may be linear. State 203B may be part linear and part sine wave.

Figure 3:
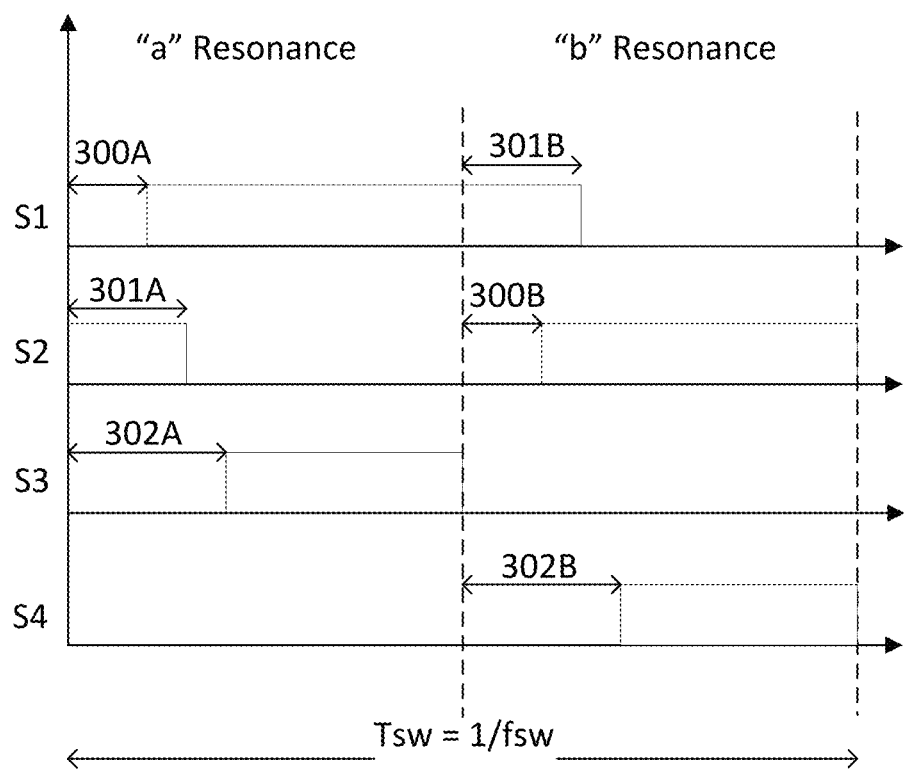
FIG. 3 illustrates an example signal chart of the controller controlling a circuit, in accordance with various aspects of the disclosure herein.

Reference is now made to FIG. 3 which shows an example of the control signal sent to the switches by controller 101. There exists a set of delays 300A, 301A, and 302A and 300B, 301B, and 302B. Delay set A and delay set B may be similar to one another and may have similar desired effects (e.g., delay 300A may be similar to delay 300B, etc.). Delays 300A, 301A, and 302A in set A and delays 300B, 301B, and 302B in set b may be to achieve ZVS and/or ZCS and may be based on the switching characteristics of the switches, which may have the advantage of increasing efficiency and decreasing switching overshoots. Delay 300A and delay 300B may allow the parallel bypass device to conduct before the switch turns on. Delay 300A and delay 300B may be based on the turn-off characteristics of the closing switch. In one example regarding the delay 300A, there may be a delay in the control signal while the transients in switch S3 dissipate. After the dissipation, the control signal may instruct switch S2 to turn on. Delay 300A and delay 300B may allow ZVS in the newly turned on switch. Delay 301A and delay 301B may be determined by the turn-off time of the closing switch and/or may be timed to the winding current falling to zero or near zero levels. The length of delay 301A and delay 301B may be functions of reverse recovery and turn-off characteristics of the switch (e.g., which may achieve ZCS or near-ZCS). For example, one turn-off characteristic may be the turn-off time of switch S1 for delay 301A. In another example, one turn-off characteristic may be the turn-off time of switch S2 for delay 301B. Delay 302A and delay 302B may be determined by the conduction time corresponding to the parallel bypass device of the switch to be turned on. For example, it may be advantageous to turn on the switch while the parallel bypass device is conducting, as this may reduce conduction losses. While reducing the delay 302A and delay 302B may reduce conduction losses, in some instances it may be advantageous reduce the delay only to a certain threshold as a delay that is too small may lead to high over-voltage overshoots in the proceeding switch (e.g., that is being turned on). For example, it may be advantageous to allow for the conduction time of switch S4 before proceeding to switch S1 for delay 302A or the conduction time of switch S3 before proceeding to switch S2 for delay 302B.

The following may comprise description and figures that may be duplicative of, or supplemental to, description and figures discussed above.

Figure 4:
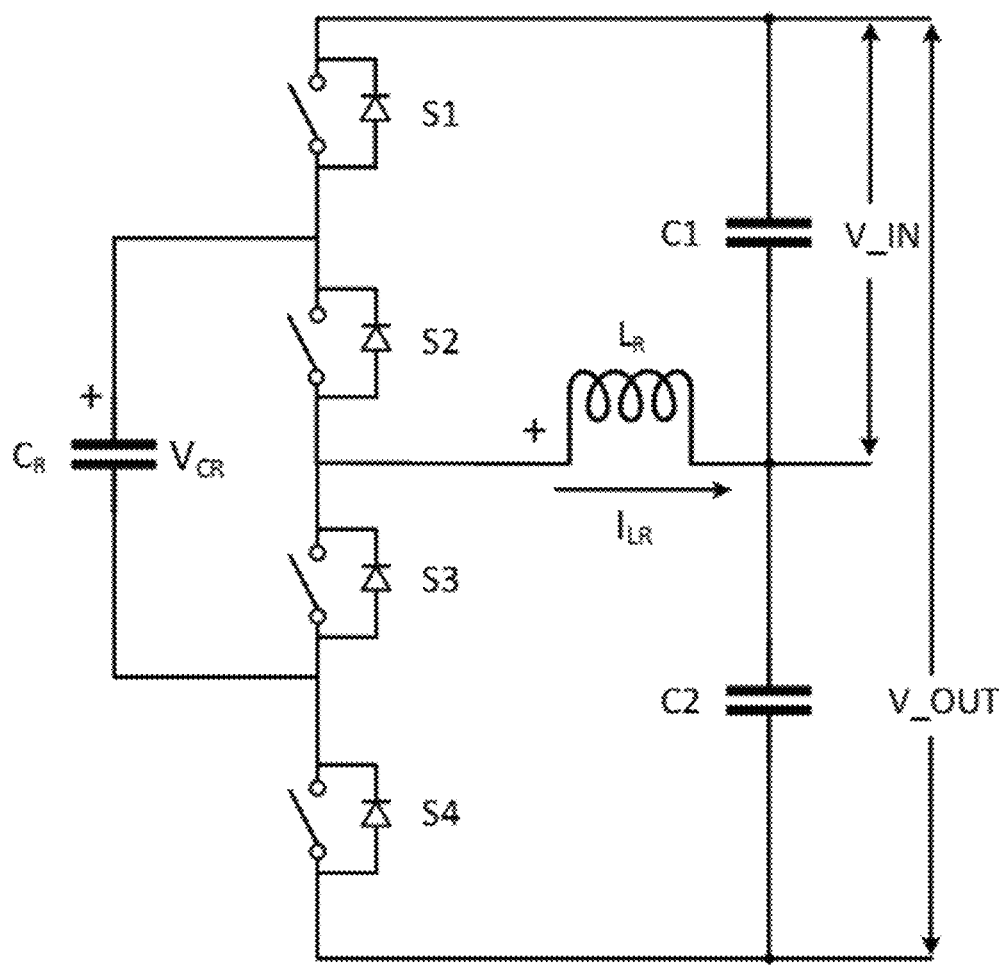
FIG. 4 illustrates a circuit in accordance with various aspects of the disclosure herein.

This document details soft switching modulation approaches for a resonant switched capacitor converter. An example topology of a resonant switched capacitor is illustrated in FIG. 4. The proposed modulation approach may have several advantages. First several of the switches have zero-voltage switching (ZVS) or zero current switching (ZCS) transitions which lead to high efficiency converter operation. Second, the converter may operate at low switching frequencies, $f_{SW}$ (as compared to the frequency of the resonant circuit formed by inductor and capacitor, $f_R$) which may simplify the design implementation and may further reduce switching losses ($f_{SW} < f_R$).

Figure 5:
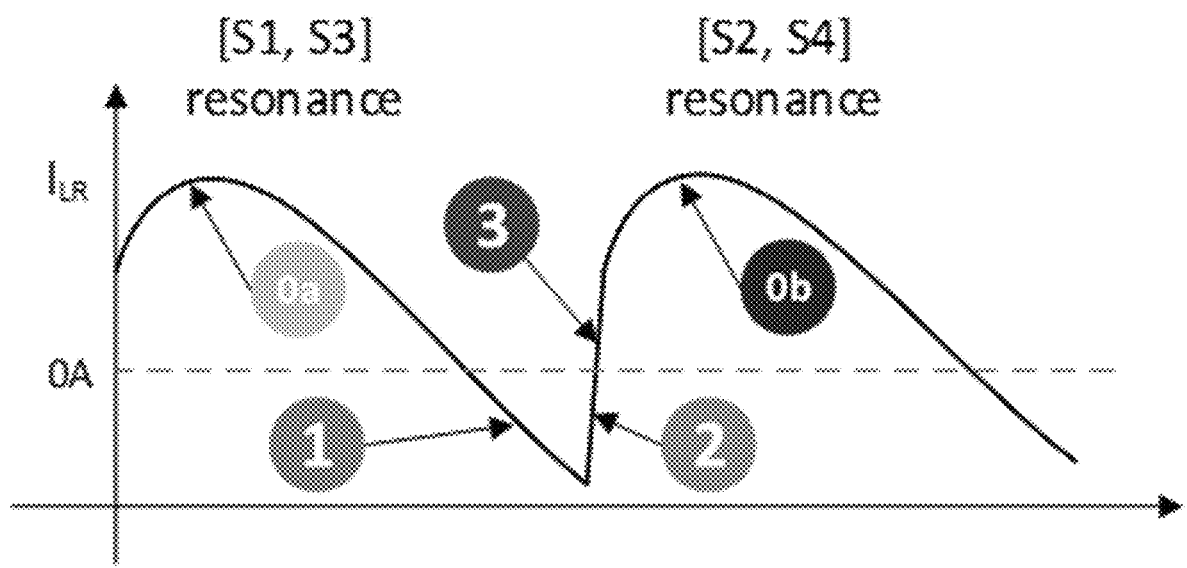
FIG. 5 illustrates a current flow in a circuit in accordance with various aspects of the disclosure herein.

FIG. 5 illustrates an exemplary resonant inductor waveform under the proposed modulation approach. FIG. 5 shows an exemplary waveform of the current in the resonant inductor ($L_R$) (for example, a resonant inductor as shown in FIG. 4). The modes of operation are annotated as "0a," "1," "2," "3," and "0b" in FIG. 5. FIG. 5 illustrates the switching devices which carry the current during the several modes of operation along with soft-switching transitions between various switching devices. FIG. 5 illustrates an example of the converter transitioning from [S1, S3] resonance to [S2, S4] resonance.

The waveform may transition between the modes annotated in FIG. 5 as follows. During mode "0a," there is a resonance circuit between power bank $C_R$ and the resonant inductor $L_R$, and the resonance inductor and capacitor may resonate. Switches S1 and S3 may remain turned-on and the current may be positive. Switches S2 and S4 are turned-off. During mode "1," the resonance current may become negative as the resonance cycle continues. The same switches S1 and S3 may continue to conduct. Switches S2 and S4 may remain turned-off. During mode "2," switch S3 may be turned-off. Although the current may be non-zero, the magnitude may be small. Hence, the switching operation may be considered ZCS switching. The current may continue to flow through switch S1 and may make its path through the body-diode of switch S2. The switch S2 gate may now be turned-on under ZVS switching. The current may change its direction and may start to rise as it sees a positive voltage of VIN. During mode "3," as the current rises, the current may reverse its polarity and become positive. The switch S1 gate may be turned-off between mode "2" and mode "3" under ZVS (e.g., near-ZCS switching operation). However, the switch S1 may continue to conduct due to diode reverse recovery process and its output capacitor charging process. During mode "0b," as switch S1 begins to turn-off and block voltage, the body diode of switch S4 may start to take-over the current and conduct. The second resonance cycle may begin wherein the resonant current flows through switches S2 and S4. Switch S4 gate may now be turned on. One example of how an SCC may transition between the modes depicted in FIG. 5 may be given in FIG. 6. FIG. 6 shows an example switching circuit illustrating an example ZVS and ZCS process during transition between [S1,S3] resonance and [S2,S4] resonance.

Figure 7:
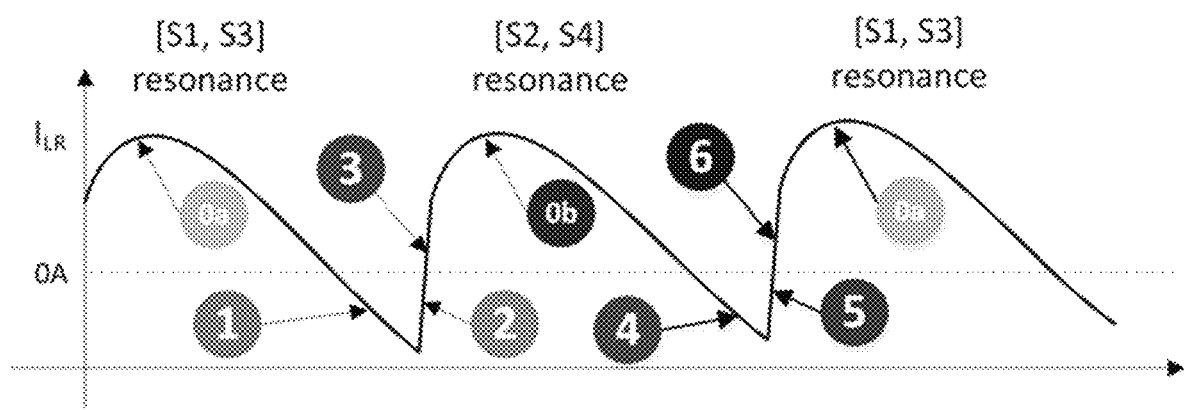
FIG. 7 illustrates a current flow in a circuit in accordance with various aspects of the disclosure herein.

The following section outlines another exemplary transition from [S2, S4] resonance to [S1, S3] resonance. FIG. 7 illustrates an example approach. FIG. 7 shows an exemplary waveform of the current in the resonant inductor ($L_R$) (for example, a resonant inductor as shown in FIG. 4).

The waveform may transition between the modes annotated in FIG. 7 as follows. During mode "0b," there is a resonance circuit between power bank $C_R$ and the resonant inductor $L_R$, and the resonance inductor and capacitor may resonate. Switches S2 and S4 may be on (conducting) and the current may be positive. Switches S1 and S3 may be turned-off. During mode "4," the resonance current may become negative as the resonance cycle continues. The same switches S2 and S4 may continue to conduct. Switches S1 and S3 may still be turned-off. During mode "5," switch S4 may be turned-off. Although the current may be non-zero, the magnitude may be small. Hence, the switching operation may be considered ZCS switching. The current may continue to flow through switch S2 and may make its path through the body-diode of switch S1. The switch S1 gate may now be turned-on under ZVS switching. The current may change its direction and may start to rise as it sees a positive voltage of VIN. During mode "6," (e.g., as the current rises) the current may reverse its polarity and may become positive. The switch S2 gate may be turned-off between mode "5" and mode "6" under ZVS and near-ZCS switching operation. However, the switch S2 may continue to conduct due to diode reverse recovery process and its output capacitor charging process. The current via the resonant inductor $L_R$ continues to rise. During mode "0a," (e.g., as switch S2 begins to turn-off and block voltage) the body diode of switch S3 may start to take-over the current and conduct. S1 is kept on. The second resonance cycle may begin (e.g., the resonant current may flow through switches S1 and S3). Switch S3 gate may now be turned on. One example of how an SCC may transition between the modes depicted in FIG. 7 may be given in FIG. 8. FIG. 8 shows an example switching circuit illustrating the ZVS and ZCS process during transition between [S2, S4] resonance and [S1,S3] resonance.

Figure 9:
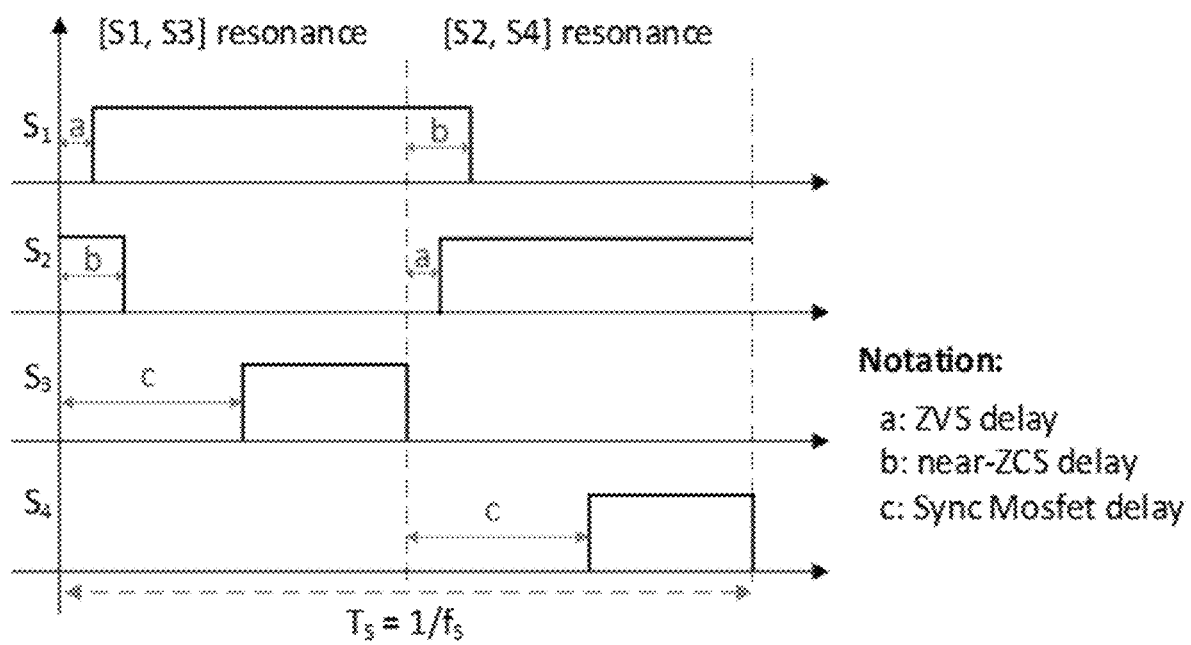
FIG. 9 illustrates an example signal chart in accordance with various aspects of the disclosure herein.

FIG. 9 illustrates exemplary gate signals for the four switches S1-S4. FIG. 9 shows exemplary gate drive signals for the switching devices for ZVS and ZCS switching operation. The delays "a," "b," and "c" may be determined based on the switching characteristics of the switches to increase efficiency and reduce switching overshoots. The delays in the gate signals are denoted as "a," "b," and "c." Considering the transition from [S1, S3] resonance to [S2, S4] resonance, the delays "a," "b," and "c" may be determined as follows. During the turn-off of switch S3, the negative inductor current may transfer from mode "1" to mode "2". The current may transfer from switch S3 to switch S2. Regarding delay "a," after switch S2 body diode starts conducting, switch S2 may be turned-on. The delay interval may be determined based on turn-off characteristics of switch S3 and the negative current magnitude. Regarding delay "b," the delay interval "b" may determine the turn-off time of switch S1. This interval may be timed to make sure that the inductor current is near zero when switch S1 stops conducting. The delay length may be a function of the reverse recovery and turn-off characteristics of the switch S1. Regarding delay "c," the delay "c" may determine the conduction time of the body diode of switch S4. The conduction losses may be reduced, for example, when the switch S4 is turned-on while it is conducting as a body diode. Hence, the delay may be minimized to reduce conduction losses. On the other hand, in some instances it may be advantageous to keep the delay above a threshold, which may reduce over-voltage overshoots in switch S1 (e.g., as charge transfer occurs between S1 and switch S4).

Although examples are described above, features and/or steps of those examples may be combined, divided, omitted, rearranged, revised, and/or augmented in any desired manner. For example, a controller 101 depicted in FIG. 1C may cause operations as described in FIG. 2A and/or FIG. 2B. In another example, the circuit of FIG. 1C may be combined with a power supply and/or load as depicted in FIG. 1E. Various alterations, modifications, and improvements are intended to be part of this description, though not expressly stated herein, and are intended to be within the spirit and the scope of the disclosure. Accordingly, the foregoing description is by way of example only, and is not limiting.

CLAUSES

A1. An apparatus comprising: a first node (A), a second node (B), a third node (C) and a fourth node (D); a first switch (S1), a second switch (S2), a third switch (S3), and a fourth switch (S4), wherein the first switch and the second switch are coupled in series between the first node and the second node, wherein the third switch and the fourth switch are coupled between the second node and third node, and wherein each of the first switch, the second switch, the third switch, and the fourth switch is coupled in parallel to a respective bypass device (D1, D2, D3, D4); a circuit configured to resonate at a resonant frequency ($f_R$), the circuit comprising: a winding ($L_R$) and power bank ($C_R$), wherein the winding is coupled between the second node and the fourth node, wherein the power bank comprises a first end and a second end, wherein the first end is coupled between the first switch and the second switch, and wherein the second end is coupled between the third switch and the fourth switch; and a controller configured to switch the first switch, the second switch, the third switch, and the fourth switch in a periodic and ordered manner.

A2. The apparatus of clause A1, wherein the controller is configured to, sequentially, in a period of operation of the first, second, third and fourth switches: (i) turn the first switch and the third switch on and turn the second switch and the fourth switch off, (ii) turn the third switch off and the second switch on, (iii) turn the first switch off and the fourth switch on, (iv) turn the fourth switch off and the first switch on, and (v) turn the second switch off and the third switch on.

A3. The apparatus of clause A1, wherein two nodes of the first node, third node, or fourth node are configured for use as input nodes, and two of the first node, third node, or fourth node are configured for use as output nodes.

A4. The apparatus of clause A3, wherein one of the first node, third node, or fourth node is duplicated for use as both an input node and an output node.

A5. The apparatus of clause A3, wherein the first node and the fourth node are configured for use as input terminals, the first node and the third node are configured for use as output terminals, and the controller is configured to control a voltage between the output terminals to be about double a voltage between the input terminals.

A6. The apparatus of clause A3, wherein the fourth node and the third node are configured for use as input terminals, the first node and the third node are configured for use as output terminals, and the controller is configured to control a voltage between the output terminals to be about double a voltage between the input terminals.

A7. The apparatus of clause A3, wherein the first node and the fourth node are configured for use as input terminals, the fourth node and the third node are configured for use as output terminals, and the controller is configured to control a voltage between the output terminals to be about the same a voltage between the input terminals.

A8. The apparatus of clause A3, wherein the fourth node and the third node are configured for use as input terminals, the first node and the fourth node are configured for use as output terminals, and the controller is configured to control a voltage between the output terminals to be about the same a voltage between the input terminals.

A9. The apparatus of clause A3, wherein the first node and the third node are configured for use as input terminals, the first node and the fourth node are configured for use as output terminals, and the controller is configured to control a voltage between the output terminals to be about half a voltage between the input terminals.

A10. The apparatus of clause A3, wherein the first node and the third node are configured for use as input terminals, the fourth node and the third node are configured for use as output terminals, and the controller is configured to control a voltage between the output terminals to be about half a voltage between the input terminals.

A11. The apparatus of clause A1, wherein the controller is configured to switch the first, second, third, and fourth switches under soft switching conditions.

A12. The apparatus of clause A11, wherein the controller is configured to switch the first, second, third, and fourth switches under soft switching conditions during a majority of switch transitions.

A13. The apparatus of clause A11, wherein the soft switching comprises zero voltage switching.

A14. The apparatus of clause A11, wherein the soft switching comprises zero current switching.

A15. The apparatus of clauses A13 and A14, wherein the controller is configured to switch a switch from the first, second, third, or fourth switch, with at least one of zero voltage switching and zero current switching when a bypass device parallel to the switch is conducting.

A16. The apparatus of clause A1 further comprising, a second power bank coupled from the first node to the fourth node and a third power bank coupled from the fourth node to the third node.

A17. The apparatus of clause A1, wherein the controller is configured to operate using open-loop feedback.

A18. The apparatus of clause A1, wherein the resonating frequency and the frequency of the controller's control signal ($f_{sw}$) do not differ by more than 10 KHz.

A19. The apparatus of clause A1, wherein the frequency of the control signal ($f_{sw}$) is lower than the resonating frequency.

A20. The system of clauses A1-A19, wherein the controller is further configured to have one or more signal delays between the switch transitions.

A21. The system of clause A20, wherein one or more of the delays is based on one of the switching characteristics of at least one of the switches.

A22. The system of clause A20, wherein one or more of the delays may allow the parallel bypass device of a switch to conduct before the switch turns on.

A23. The system of clause A20, wherein one or more of the delays is based on the control signal waiting for the transients to dissipate in at least one switch.

A24. The system of clause A20, wherein one or more of the delays may allow soft switching in a switch that is turned on.

A25. The system of clause A20, wherein one or more of the delays may be timed to the winding current to fall to zero or near zero levels.

A26. The system of clause A20, wherein one or more of the delays may be functions of reverse recovery of at least one of the switches.

A27. The system of clause A20, wherein one or more of the delays may be determined by a conduction time of the parallel bypass device of the switch to be turned on.

A28. The system of clause A20, wherein one or more of the delays may be minimized to reduce conduction losses.

A29. The system of clause A20, wherein one or more of the delays are large enough to avoid high over-voltage overshoots in the proceeding switch to be turned on.

A30. The system of clauses A1-29, wherein the circuit is used as an uninterruptable power source.

A31. A method comprising: controlling, using a controller, a resonant circuit comprising: a first node (A), a second node (B), a third node (C) and a fourth node (D); a first switch (S1), a second switch (S2), a third switch (S3), and a fourth switch (S4), wherein the first switch and the second switch are coupled in series between the first node and the second node, wherein the third switch and the fourth switch are coupled between the second node and the third node, and wherein each of the first switch, the second switch, the third switch and the fourth switch is coupled in parallel to a respective bypass device (D1, D2, D3, D4); resonating, at a resonant frequency ($f_R$), the resonant circuit by a winding ($L_R$) and a power bank ($C_R$); determining, by a controller, to switch the first, second, third and fourth switches in a periodic and ordered manner in the following order: (i) turning on the first switch and the third switch, (ii) turning off the third switch and turning on the second, (iii) turning off the first switch and turning on the fourth switch, (iv) turning off the fourth switch and turning on the first switch, and (v) turning off the second switch and turning on the third switch.

A32. The method of clause A31, further comprising configuring two nodes of the first node, third node, and fourth node for use as input nodes, and configuring two of the first node, third node, and fourth node for use as output nodes.

A33. The method of clause A32, further comprising duplicating one of the first node, third node, and fourth node for use as both an input node and an output node.

A34. The method of clause A32, further comprising a doubling of a voltage between an input terminal and an output terminal by the controlling of a voltage between the output terminals, wherein the first node and the fourth node are configured for use as input terminals, and wherein the first node and the third node are configured for use as output terminals.

A35. The method of clause A32, further comprising a doubling of a voltage between an input terminal and an output terminal by the controlling of a voltage between the output terminals, wherein the fourth node and the third node are configured for use as input terminals, and wherein the first node and the third node are configured for use as output terminals.

A36. The method of clause A32, further comprising a mirroring of a similar voltage between an input terminal and an output terminal by the controlling of a voltage between the output terminals, wherein the first node and the fourth node are configured for use as input terminals, and wherein the fourth node and the third node are configured for use as output terminals.

A37. The method of clause A32, further comprising a mirroring of a similar voltage between an input terminal and an output terminal by the controlling of a voltage between the output terminals, wherein the fourth node and the third node are configured for use as input terminals, and wherein the first node and the fourth node are configured for use as output terminals.

A38. The method of clause A32, further comprising a halving of a voltage between an input terminal and an output terminal by the controlling of a voltage between the output terminals, wherein the first node and the third node are configured for use as input terminals, and wherein the first node and the fourth node are configured for use as output terminals.

A39. The method of clause A32, further comprising a halving of a voltage between an input terminal and an output terminal by the controlling of a voltage between the output terminals, wherein the first node and the third node are configured for use as input terminals, and wherein the fourth node and the third node are configured for use as output terminals.

A40. The method of clause A31, wherein the determining to switch comprises determining to switch the first, second, third, and fourth switches under soft switching conditions.

A41. The method of clause A40, wherein the determining to switch comprises determining to switch the first, second, third, and fourth switches under soft switching conditions during a majority of switch transitions.

A42. The method of clause A40, wherein the soft switching comprises zero voltage switching.

A43. The method of clause A40, wherein the soft switching comprises zero current switching.

A44. The method of clauses A42 and A43, wherein the determining to switch comprises determining to switch a switch from the first, second, third, or fourth switch, with at least one of zero voltage switching and zero current switching during the bypassing by a bypass device parallel to the switch when the bypass device is conducting.

A45. The method of clause A31 further comprising, a second power bank coupled from the first node to the fourth node and a third power bank coupled from the fourth node to the third node.

A46. The method of clause A31, further comprising controlling by the controller an open-loop feedback.

A47. The method of clause A31, further comprising the resonating frequency and the frequency of the controller's control signal ($f_{sw}$) being within a 10 KHz range of one another.

A48. The method of clause A31, further comprising the frequency of the control signal being lower than the resonating frequency.

A49. The system of clauses A31-A48, further comprising controlling by the controller at least one signal delay between the switches transitions.

A50. The system of clause A49, wherein one or more of the delays is based on one of the switching characteristics of at least one of the switches.

A51. The system of clause A49, wherein one or more of the delays may allow the parallel bypass device of a switch to conduct before the switch turns on.

A52. The system of clause A49, wherein one or more of the delays is based on the control signal waiting for the transients to dissipate in at least one switch.

A53. The system of clause A49, wherein one or more of the delays may allow soft switching in a switch that is turned on.

A54. The system of clause A49, wherein one or more of the delays may be timed to the winding current to fall to zero or near zero levels.

A55. The system of clause A49, wherein one or more of the delays may be functions of reverse recovery of at least one of the switches.

A56. The system of clause A49, wherein one or more of the delays may be determined by a conduction time of the parallel bypass device of the switch to be turned on.

A57. The system of clause A49, wherein one or more of the delays may be minimized to reduce conduction losses.

A58. The system of clause A49, wherein one or more of the delays are large enough to avoid high over-voltage overshoots in the proceeding switch to be turned on.

A59. The system of clauses A31-A58, wherein the circuit is used as an uninterruptable power source.

A60. A system comprising: a circuit comprising: a first node (A), a second node (B), a third node (C) and a fourth node (D); a first switch (S1), a second switch (S2), a third switch (S3), and a fourth switch (S4), wherein the first switch and the second switch are coupled in series between the first node and the second node, wherein the third switch and the fourth switch are coupled between the second node and the third node, wherein each of the first switch, the second switch, the third switch and the fourth switch is coupled in parallel to a respective bypass device (D1, D2, D3, D4); a circuit configured to resonate at a resonant frequency ($f_R$), the circuit comprising: a winding ($L_R$) and power bank ($C_R$), wherein the winding is coupled between the second node and the fourth node, wherein the power bank comprises a first end and a second end, wherein the first end is coupled between the first switch and the second switch, and wherein the second end is coupled between the third switch and the fourth switch; and a controller configured to switch the first switch, the second switch, the third switch and the fourth switch in a periodic and ordered manner, a power source connected to a first subset of the first, second, third, and fourth nodes; and a load connected to a second subset of the first, second, third, and fourth nodes.

A61. The system of clause A60, wherein the first node and the fourth node are coupled to the power source, the first node and the third node are coupled to the load, and the controller is configured to control a voltage between the output terminals to be about double a voltage between the input terminals.

A62. The system of clause A60, wherein the fourth node and the third node are coupled to the power source, the first node and the third node are coupled to the load, and the controller is configured to control a voltage between the output terminals to be about double a voltage between the input terminals.

A63. The system of clause A60, wherein the first node and the fourth node are coupled to the power source, the fourth node and the third node are coupled to the load, and the controller is configured to control a voltage between the output terminals to be about the same a voltage between the input terminals.

A64. The system of clause A60, wherein the fourth node and the third node are coupled to the power source, the first node and the fourth node are coupled to the load, and the controller is configured to control a voltage between the output terminals to be about the same a voltage between the input terminals.

A65. The system of clause A60, wherein the first node and the third node are coupled to the power source, the first node and the fourth node are coupled to the load, and the controller is configured to control a voltage between the output terminals to be about half a voltage between the input terminals.

A66. The system of clause A60, wherein the first node and the third node are coupled to the power source, the fourth node and the third node are coupled to the load, and the controller is configured to control a voltage between the output terminals to be about half a voltage between the input terminals.

A67. The system of clauses A60-A66, wherein the power source is a photovoltaic cell.

A68. The system of clauses A60-A66, wherein the power source is a string of photovoltaic cells.

A69. The system of clauses A60-A66, wherein the power source is a combiner box.

A70. The system of clauses A60-A66, wherein the power source is a junction box.

A71. The system of clauses A60-A66, wherein the power source is an uninterruptable power source (UPS).

A72. The system of clauses A60-A66, wherein the power source is a battery.

A73. The system of clauses A60-A66, wherein the power source is a maximum power point tracking (MPPT) circuit.

A74. The system of clauses A60-A66, wherein the power source is a direct current (DC) power converter.

A75. The system of clauses A60-A66, wherein the load is a photovoltaic cell.

A76. The system of clauses A60-A66, wherein the load is a string of photovoltaic cells.

A77. The system of clauses A60-A66, wherein the load is a combiner box.

A78. The system of clauses A60-A66, wherein the load is a junction box.

A79. The system of clauses A60-A66, wherein the load is an uninterruptable power source (UPS).

A80. The system of clauses A60-A66, wherein the load is a maximum power point tracking (MPPT) circuit.

A81. The system of clauses A60-A66, wherein the load is a battery.

A82. The system of clauses A60-A66, wherein the load is an inverter.

A83. The system of clauses A60-A66, wherein the load is a transformer.

A84. The system of clauses A60-A66, wherein the load is an alternating current (AC) power converter.

A85. The system of clauses A60-A84, wherein the controller is further configured to have one or more signal delays between the switches transitions.

A86. The system of clause A85, wherein one or more of the delays is based on one of the switching characteristics of at least one of the switches.

A87. The system of clause A85, wherein one or more of the delays may allow the parallel bypass device of a switch to conduct before the switch turns on.

A88. The system of clause A85, wherein one or more of the delays is based on the control signal waiting for the transients to dissipate in at least one switch.

A89. The system of clause A85, wherein one or more of the delays may allow soft switching in a switch that is turned on.

A90. The system of clause A85, wherein one or more of the delays may be timed to the winding current to fall to zero or near zero levels.

A91. The system of clause A85, wherein one or more of the delays may be functions of reverse recovery of at least one of the switches.

A92. The system of clause A85, wherein one or more of the delays may be determined by the conduction time of the parallel bypass device of the switch to be turned on.

A93. The system of clause A85, wherein one or more of the delays may be minimized to reduce the conduction losses.

A94. The system of clause A85, wherein one or more of the delays are large enough to avoid high over-voltage overshoots in the proceeding switch to be turned on.

A95. The system of clauses A61-A94, wherein the circuit is used as an uninterruptable power source (UPS).

A96. The system in clause A68, wherein, the string voltage is kept to a regulated voltage level.

What is claimed is:
1. An apparatus comprising:
a plurality of nodes, comprising: a first node, a second node, a third node, a fourth node, a fifth node, and a sixth node;
a plurality of switches, comprising: a first switch, a second switch, a third switch, a fourth switch, a fifth switch, a sixth switch, a seventh switch, and an eighth switch;
a plurality of bypass diodes, comprising: a first bypass diode connected in parallel to the first switch, a second bypass diode connected in parallel to the second switch, a third bypass diode connected in parallel to the third switch, a fourth bypass diode connected in parallel to the fourth switch, a fifth bypass diode connected in parallel to the fifth switch, a sixth bypass diode connected in parallel to the sixth switch, a seventh bypass diode connected in parallel to the seventh switch, and an eighth bypass diode connected in parallel to the eighth switch;
a capacitor;
an inductor; and
a controller,
wherein:
the first switch is connected in series to the fifth switch between the first node and the second node;
the second switch is connected in series to the sixth switch between the second node and the third node;
the third switch is connected in series to the seventh switch between the third node and the fourth node;
the fourth switch is connected in series to the eighth switch between the fourth node and the fifth node;
the first bypass diode and the fifth bypass diode have opposite anode-cathode orientation;
the second bypass diode and the sixth bypass diode have opposite anode-cathode orientation;
the third bypass diode and the seventh bypass diode have opposite anode-cathode orientation;

the fourth bypass diode and the eighth bypass diode have opposite anode-cathode orientation;

the capacitor is connected between the second node and the fourth node;

the inductor is connected between the third node and the sixth node; and the controller is configured to convert input power:
in a first manner by switching the first switch, the second switch, the third switch, and the fourth switch in a first pattern; and
in a second manner by switching the fifth switch, the sixth switch, the seventh switch, and the eighth switch in a second pattern.

2. The apparatus of claim 1, wherein the controller is configured to control a delay between switching one switch, of the plurality of switches, and switching a different switch of the plurality of switches.

3. The apparatus of claim 2, wherein the controller is further configured to control the delay to be above a threshold value that reduces a voltage overshoot in the one switch or the different switch.

4. The apparatus of claim 1, wherein the controller is further configured to, during converting of the input power, cause the capacitor and the inductor to resonate at a resonant frequency.

5. The apparatus of claim 1, wherein the controller is further configured to, during converting of the input power, turn on a given switch, of the plurality of switches, while a bypass diode, of the plurality of bypass diodes and connected in parallel to the given switch, is conducting.

6. The apparatus of claim 1, wherein the first node, the fifth node, and the sixth node are configured to receive an input voltage or provide an output voltage.

7. The apparatus of claim 6, wherein one of the first node, the fifth node, and the sixth node is configured to both receive the input voltage and provide the output voltage.

8. The apparatus of claim 6, wherein the input voltage comprises alternating current (AC) voltage.

9. The apparatus of claim 1, wherein the controller is further configured to control a first voltage between the first node and the fifth node such that the first voltage is at a predetermined ratio of a second voltage between the first node and the sixth node.

10. The apparatus of claim 9, wherein the predetermined ratio is substantially double, substantially equal, or substantially half.

11. The apparatus of claim 1, wherein the controller is further configured to switch the plurality of switches under soft switching conditions.

12. The apparatus of claim 11, wherein the soft switching conditions comprise zero voltage switching.

13. The apparatus of claim 11, wherein the soft switching conditions comprise zero current switching.

14. The apparatus of claim 1, further comprising:
a second capacitor connected between the first node and the sixth node; and
a third capacitor connected between the sixth node and the fifth node.

15. The apparatus of claim 1, wherein the controller is further configured to, during converting of the input power, control at least one switch, of the plurality of switches, to turn on or off at a switching frequency different than a resonant frequency of the capacitor and the inductor.

16. The apparatus of claim 15, wherein a difference between the resonant frequency and the switching frequency is less than 10 KHz.

17. The apparatus of claim 1, wherein the apparatus is connected to a transformer.

18. An apparatus comprising:
a plurality of nodes, comprising: a first node, a second node, a third node, a fourth node, a fifth node, and a sixth node;
a plurality of switches, comprising: a first switch, a second switch, a third switch, a fourth switch, a fifth switch, a sixth switch, a seventh switch, and an eighth switch;
a plurality of bypass diodes, comprising: a first bypass diode connected in parallel to the first switch, a second bypass diode connected in parallel to the second switch, a third bypass diode connected in parallel to the third switch, a fourth bypass diode connected in parallel to the fourth switch, a fifth bypass diode connected in parallel to the fifth switch, a sixth bypass diode connected in parallel to the sixth switch, a seventh bypass diode connected in parallel to the seventh switch, and an eighth bypass diode connected in parallel to the eighth switch;
a capacitor;
an inductor; and
a controller,
wherein:
the first switch is connected in series to the fifth switch between the first node and the second node;
the second switch is connected in series to the sixth switch between the second node and the third node;
the third switch is connected in series to the seventh switch between the third node and the fourth node;
the fourth switch is connected in series to the eighth switch between the fourth node and the fifth node;
an anode of the first bypass diode is connected to an anode of the fifth bypass diode;
an anode of the second bypass diode is connected to an anode of the sixth bypass diode;
an anode of the third bypass diode is connected to an anode of the seventh bypass diode;
an anode of the fourth bypass diode is connected to an anode of the eighth bypass diode;
the capacitor is connected between the second node and the fourth node;
the inductor is connected between the third node and the sixth node; and
the controller is configured to convert input power:
in a first manner by switching the first switch, the second switch, the third switch, and the fourth switch in a first pattern; and
in a second manner by switching the fifth switch, the sixth switch, the seventh switch, and the eighth switch in a second pattern.

19. The apparatus of claim 18, wherein the controller is configured to control a delay between switching one switch, of the plurality of switches, and switching a different switch of the plurality of switches.

20. The apparatus of claim 19, wherein the controller is further configured to control the delay to be above a threshold value that reduces a voltage overshoot in the one switch or the different switch.

* * * * *